(12) United States Patent
Driehaus

(10) Patent No.: US 6,809,062 B2
(45) Date of Patent: Oct. 26, 2004

(54) PROCESS FOR PRODUCING AN IRON-CONTAINING SORPTION MATERIAL

(75) Inventor: Wolfgang Driehaus, Bissendorf (DE)

(73) Assignee: GEH Wasserchemie & Co. KG, Osnabrueck (DE)

( * ) Notice: Subject to any disclaimer, the term of this patent is extended or adjusted under 35 U.S.C. 154(b) by 0 days.

(21) Appl. No.: 10/460,643

(22) Filed: Jun. 13, 2003

(65) Prior Publication Data

US 2004/0038817 A1 Feb. 26, 2004

Related U.S. Application Data

(63) Continuation-in-part of application No. PCT/DE01/04666, filed on Dec. 12, 2001.

(30) Foreign Application Priority Data

Dec. 13, 2000 (DE) .......................................... 100 61 800

(51) Int. Cl.$^7$ ............................................... B01J 20/00
(52) U.S. Cl. ....................................... 502/400; 502/338
(58) Field of Search ............................... 502/400, 338, 502/439

(56) References Cited

U.S. PATENT DOCUMENTS 4,459,276 A    7/1984   Nobuoka et al.

FOREIGN PATENT DOCUMENTS

| DE | 4320003  | 12/1994 |
|----|----------|---------|
| DE | 19745664 | 4/1999  |
| DE | 19826186 | 12/1999 |

OTHER PUBLICATIONS

International Search Report, no date.

*Primary Examiner*—Stanley S. Silverman
*Assistant Examiner*—Edward M. Johnson
(74) *Attorney, Agent, or Firm*—Crowell & Moring LLP

(57) ABSTRACT

A method for producing an iron-containing sorption material for treating feed water or waste water in order to remove harmful trace constituents by adsorption. To this end, an iron-containing solution is initially dehydrated in order to increase the salt content and transformed into a suspension of iron-containing solids from which the sorption material is obtained. By subsequently increasing the pressure of the suspension at a temperature of less than −5° C., the iron-containing solids in the suspension are transformed to dimensionally stable solid complexes. The iron-complex containing particles significantly facilitate treatment of water to remove hazardous trace materials because they provide a large surface area for carrying out the adsorption, yet filters made of this material do not become clogged even when treating heavily polluted waste water. In addition, the use of the sorption material of the invention makes it possible to dispense with use of fillers and/or auxiliary filter materials.

10 Claims, No Drawings

US 6,809,062 B2

PROCESS FOR PRODUCING AN IRON-CONTAINING SORPTION MATERIAL

CROSS REFERENCE TO RELATED APPLICATIONS

This application is a continuation-in-part of international patent application no. PCT/DE01/04666, filed Dec. 12, 2001, designating the United States of America, and published in German as WO 02/47811, the entire disclosure of which is incorporated herein by reference. Priority is claimed based on Federal Republic of Germany patent application no. DE 100 61 800.6, filed Dec. 13, 2000.

BACKGROUND OF THE INVENTION

The invention relates to a process or method for producing an iron-containing sorption material for treating water or an aqueous effluent. An iron-containing solution is adjusted to a specific salt content and thereby transformed into an iron oxide-containing suspension. The sorption material is obtained from the solids content of this suspension.

It has been known in water purification the art for a number of years to utilize the adsorption properties of iron hydroxide in technical systems. For this purpose, substances containing iron as metal or oxide or hydroxide are used in the form of granulates. These granulates are used as a filter bed in simple filter cells or special reactors. The water or effluent to be purified is guided through the filter bed to remove dissolved harmful trace constituents from the water or effluent through adsorption to the surface of the material.

Furthermore, methods are known in the art in which precipitation processes are used for the same purpose and a dissolved iron compound is added to the water or effluent. By subsequent hydrolysis, iron hydroxide floc is formed to which the pollutants are adsorbed. The floc is then separated from the water or effluent. This requires substantial control and monitoring, however, to ensure that the purification effect on the water or effluent remains constant.

Published German patent application no. DE 43 20 003 A1, for example, discloses a process for removing dissolved arsenic using solid iron hydroxide for water purification. The iron hydroxide can be obtained from the suspension by adding a stoichiometrically equivalent amount of an alkaline solution to an acid iron salt solution until the pH remains stable in the neutral range between 6 and 8. The suspension is subsequently washed and is then available for the conditioning of fixed bed filters. In addition, after the suspension has been produced, it can be transformed into a hydroxide gel by centrifugation. The gel is then subjected to freeze conditioning at temperatures below −5° C. to convert the gel into a granulated material, which can be used directly in the fixed bed filters. In practice, a drawback of this process is the poor quality of the granulated material because the material is comparatively soft and fine-grained. As a result, a substantial amount of material is lost when a filter filled with the material is backwashed. New material must therefore be added after each backwashing, which significantly adds to the cost of the process. In addition, the water or effluent to be treated must be relatively clean. Otherwise, solids in the water are adsorbed on the granulate because of the filtering action. This interferes with the removal of the desired components.

Published German patent application no. DE 197 45 664 A1 discloses a known process for producing a granulate for purifying an arsenic-containing fluid. The granulate is essentially produced from silica sand and iron powder or iron chips by calcining at high temperatures. In the subsequent process for arsenic removal, this granulate must first be activated by dissolved oxygen to bring about an oxidation through the reaction with the oxygen and the water in which iron hydroxide is formed. In this oxidized form, arsenic can be adsorbed to the granulate to remove the undesirable arsenic from the water or effluent. A drawback of this process is the high cost of energy used in production of the sorbent material caused particularly by the high process temperatures. Furthermore, the water or effluent to be treated is modified by the reaction of the metallic iron forming the iron hydroxide, as this binds oxygen from the water and lowers the pH of the water through the release of $H^+$ ions. Because of the small amounts of iron contained in the material, the absorption capacity of the material is moreover limited. In addition, a relatively long contact time between water and granulate is required. As a result, the corresponding filter systems must be very large and are therefore uneconomical.

Published German patent application no. DE 198 34 916 A1 discloses a filter paper for water purification, which contains iron oxide and iron hydroxide, among other things, and which can be used, for example, to purify arsenic-containing water. Described, for instance, is the single or multiple charging of the filter paper with the contaminated water or the use of pieces of filter paper in reactors or filter cells. A drawback in practice is that technical implementation can be connected with significant problems because the pressure of the water can cause the pieces of filter paper to stick together and to form a dense and poorly permeable filter body.

SUMMARY OF THE INVENTION

It is an object of the invention to provide an improved process for preparing an iron-containing sorption material.

Another object of the invention is to provide an efficient, low-cost process for preparing an iron-containing sorption material.

A further object of the invention is to provide a process for producing a particulate sorption material which has a high degree dimensional stability and abrasion resistance.

An additional object of the invention is to provide a process for producing an iron-containing sorption material which is simple and economical in use with simultaneous high efficiency.

It is also an object of the invention to provide a process for producing an iron-containing sorption material which does not require activation prior to use.

These and other objects are achieved in accordance with the present invention by providing a process for producing an iron-containing sorption material for treating water or effluent, said process comprising adjusting the salt content of an iron salt-containing solution to transform the solution to an iron oxide-containing suspension, and treating the iron oxide-containing suspension to obtain a particulate iron oxide-containing sorption material from suspended iron-containing solids in the suspension, wherein said treating comprises subjecting the iron-containing solids to a relative pressure increase of the suspension at a temperature of less than 5° C., whereby the solids from the suspension are formed into solid complexes.

Further advantageous embodiments of the process according to the invention are described hereinafter.

According to the invention, a method is provided in which iron-containing solids are formed into solid complexes by a relative pressure increase of the suspension at a temperature of less than 5° C. With this method, a sorption material is provided whose solid complexes have a high degree of dimensional stability. As a result, under the influence of high fluid pressure, they do not tend to stick together or clog the gaps. This makes it possible, in particular, to use the sorption material to treat even highly polluted effluents without risking an efficiency-reducing adsorption of dirt particles contained in the effluent. Furthermore, in the production process it is not necessary to activate the sorption material prior to use. This facilitates the use of the sorption material on the one hand and excludes undesirable influences on the quality of the water or effluent on the other, especially a change in the pH. Furthermore, the use of the sorption material produced in accordance with this process clearly reduces the control and monitoring costs, as the sorption material does not need to be monitored. In addition, the sorption material produced by this process has a high iron oxide or iron hydroxide content because the use of fillers and auxiliary agents is largely avoided. In practice, the solid complexes have a diameter of between 0.1 and approximately 3 mm.

A convenient and effective way of subjecting the suspension to an increase in pressure is to subject the suspension to a freezing temperature, i.e., to a temperature of less than 0° C., preferably less than −5° C., in a sealed container. In this way, the well known expansion of aqueous systems as they freeze serves to apply pressure to the suspension.

In one particularly advantageous embodiment of the process according to the invention, the solid complexes are formed or shaped into dimensionally stable grains by the pressure increase. This substantially facilitates the handling and thus the industrial use of the material and thereby increases the economic efficiency. By controlling the pressure pattern or the maximum pressure, it is possible specifically to influence the quality of the grains so that they can be adapted to the individual application conditions.

It is particularly advantageous if the pressure is increased within a pressure range of between $4*10^7$ Pa and $10^8$ Pa. In practice it has been shown that in addition to the iron hydroxide particles combining into dimensionally very stable iron hydroxide grains, crystallization processes also take place, which further improve the physical properties of the iron hydroxide grains.

In a particularly advantageous embodiment, the solids content of the suspension is at least 10%. This makes it possible to prepare solid complexes that are highly reactive and, in addition, have the desired mechanical properties that make them suitable for a broad range of industrial applications. Solids contents of 15% to 25% are optimally suited for economically efficient applications.

An especially effective embodiment of the process according to the invention is achieved if the pressure is released after it has previously been increased to enhance the dimensional stability of the solid complexes. By controlling the pressure release, it is possible specifically to obtain the desired geometries and surface properties of the solid complexes. The pressure release is particularly related to the preceding pressure increase so that it is determined independently of the ambient pressure.

Another especially advantageous embodiment of the process according to the invention is achieved if the solid complexes are dried. As a result, the sorption material can be used as intended directly after the production process. This prevents, in particular, any accidental deformation of the solid complexes due to undesirable environmental influences after the pressure-dependent shaping.

It is especially advantageous if the solid complexes are dried by heating to remove the moisture quickly. In practice, it has been observed that this improves the solid complexes. The background is again a regrouping of the components of the solid complexes, the pattern of which can be substantially determined by controlling the temperature influences. It is particularly practical if air is introduced for drying. This reduces the cost of energy in production. Also feasible are modifications where the gaseous medium used for drying can in turn be used as a carrier for reactive substances.

In a further particularly advantageous embodiment of the method according to the invention, the solid complexes are treated with a cation-containing activating solution. This changes the polarization on the surface of the solid complexes, making it possible to further enhance the process of adsorbing the undesirable pollutants from the water or effluent.

EXAMPLE 1

Approximately 19 liters of a solution of sodium hydroxide having a concentration of 200 g/liter was added with stirring to 26 liters of an acid solution containing 1.8 kilograms of iron (as iron$^{III}$). The salt content and the temperature increased, and a suspension of iron hydroxide was produced. At the end of the reaction an electrical conductivity of 96 mS/cm and a temperature of 33° C. were measured. The pH-value was 6.6.

The resulting suspension was converted to a pasty mass by filtering and washing, for example in a filter press. At the end of the washing procedure, the salt content of the filtrate amounted to approximately 0.82 g/liter. The solids content of the resulting paste was approximately 20%.

The approximately 17 kg of paste which resulted was then filled into a suitable container of synthetic resin material (plastic). The container was tightly sealed and then stored in a cooling chamber at a temperature of −6° C. Expansion to due freezing of the liquid caused pressure to build up in the suspension, until the pressure had increased to a value of about $1*10^8$ Pascal (Pa) at the boundary between the water and the iron-containing solids. As a result of this increase in pressure, iron-containing solid complexes were formed, in which the suspended iron oxide particles coalesced and chemically bound water was split off or eliminated from the suspended particles. In this way, the iron hydroxide Fe(OH)3 was transformed into iron oxide hydrate. After 140 hours, the process was completed.

After a slow warming, the iron-containing solid complexes could be removed from the container as stably formed particles. A clear, iron-free solution remained, which was be discarded.

In this way, the solid complexes of the invention were obtained in the form of a granulate. The average particle size of the granulate lay in the range from 0.6 to 1.0 mm. The resulting granulate can be utilized in filter installations or filter systems to remove harmful substances such as arsenic either directly after recovery or after separating fine particle sizes smaller than 0.3 mm (e.g. by sieving). The granular filter material in such a filter system was backwashed with only a small loss of fine materials, amounting to about 0.025 mass-% per backwashing.

The stability and abrasion resistance of the resulting material could be significantly improved by subjecting the particles to drying at a temperature of 35° C. This was achieved by passing warmed air through a loose bed of the particulate material in a drying vessel. At the end of the drying after 7 hours, the water content was about 32%.

However, a dry, pourable product was obtained having additionally improved mechanical stability. Surprisingly, the binding capacity or adsorption capacity for harmful materials was not diminished by the drying.

Solid complexes produced according to the foregoing procedure had a harmful substance adsorption capacity of 28 grams per kilogram, based on arsenic (V) at a treated solution pH value of 7.0. This harmful substance adsorption capacity could be significantly increased by optional activation treatment with a solution which contained, for example, $Ca^{2+}$ or $Cu^{2+}$.

This increased activity was achieved by treating the solid complexes which had been obtained prior to drying in a column with a solution which contained 0.03 moles per liter of calcium (e.g., in the form of calcium chloride). After subsequent drying, the thusly treated solid complexes had an up to 30% greater adsorption capacity for harmful substances which are present in the form of anions, for example arsenic (V). By treatment with a copper chloride solution having a concentration of 0.02 moles per liter, the harmful substance binding capacity could be increased up to 75%.

By activation with divalent cations and subsequent drying with moderately heated air, the resulting solid complexes are also suitable for treating water from which the removal of harmful substances is otherwise very difficult because such water contains, for example, dissolved or suspended materials which complex with the harmful substances to be removed when the harmful substance is bound to the adsorbent or which precipitate or deposit on the surface of the solid complexes.

EXAMPLE 2

One and one-half liters of water at a temperature of 20° C. were introduced into a beaker, and 28.75 g of solid iron (III) chloride were dissolved therein. Into this solution, 0.3 liters of a sodium hydroxide solution having a concentration of 1.8 moles per liter were added with stirring over the course of 20 minutes. The salt content and the temperature increased, and a suspension of iron hydroxide formed. At the end of the reaction, a pH value of 7.4, an electrical conductivity of 18 mS/cm and a temperature of 23° C. were measured.

The resulting suspension was converted to a pasty mass by filtering and washing in a suction filter, whereupon the salt content of the filtrate at the end of the washing procedure amounted to about 1.4 g/liter. The water content of the resulting paste amounted to about 88%. The resulting paste was filled into polyethylene bottles; the bottles were sealed, and then the bottles were stored in a cooling chamber at a temperature of −20° C. As a result of the freezing of the water, a pressure built up in the suspension, which was not, however, measured in this experiment. As a result of this increase in pressure, iron-containing solid complexes formed in which the suspended particles coalesced and chemically bound water was split off or eliminated from the suspended particles. This process was complete after 40 hours.

After gradual warming, the iron-containing solid complexes were recovered from the container as dimensionally stable particles. A clear liquid remained in the container, which was discarded.

In this way, solid complexes according to the invention were obtained in the form of a granulate in which the particle size ranged up to 0.8 mm. The granulate which was obtained could be used in a filter system to separate hazardous trace materials and could be backwashed with only a very low loss of fines (abrasion loss) amounting to about 1.5 mass-%. The hazardous material binding capacity was very high, amounting to 60 mg/g, based on arsenic (V) at a pH value in the solution of 7.0.

EXAMPLE 3

235 kg of a 40% solution of iron (III) chloride was added to 3750 liters of water at a temperature of 16° C. and thoroughly mixed. Into this solution, which had a temperature of 19° C., were added 400 liters of a sodium hydroxide solution having a concentration of 175 g/liter over the course of 2.5 hours. An iron hydroxide suspension formed having a salt content of about 25 g/liter and a temperature of 28° C. The pH-value was 6.4.

The resulting iron hydroxide suspension was converted into a pasty mass by filtering and washing in a cross-flow filter apparatus and a filter press. The salt content of the filtrate at the conclusion of the washing process amounted to 6.5 g/liter. The solids content of the resulting paste amounted to approximately 22.5%. A filter cake was obtained which weighed about 280 kg. The filter cake was transferred to a steel vessel. The vessel was sealed tight and then stored in a cooling chamber at a temperature of −18° C. As in the preceding examples, a pressure built up in the suspension as a result of the freezing of the water which amounted to about $8*10^7$ Pa at the boundary between the water and the iron-containing solids. As a result of this pressure increase, iron-containing solid complexes formed in which the suspended particles coalesced and chemically bound water from the suspended particles was split off or eliminated. The process was complete after 240 hours.

After gradual warming the iron-containing solid complexes could be recovered from the container in the form of dimensionally stable particles. A clear, iron-free solution remained in the container, which was discarded.

In this way, the solid complexes of the invention were obtained in the form of a granulate. The average particle size of the granulate lay in the range from 0.8 to 1.0 mm. The resulting granulate can be utilized in filter installations or filter systems to remove harmful substances such as arsenic either directly after recovery or after separating fine particle sizes smaller than 0.3 mm (e.g. by sieving). The loss of fines (abrasion loss) during backwashing was very small and amounted to only 0.025 mass-% per backwashing.

Solid complexes produced according to the foregoing procedure had a harmful substance adsorption capacity of 28 grams per kilogram, based on arsenic (V) at a treated solution pH value of 7.0. This harmful substance adsorption capacity was significantly increased by an activation treatment with a solution which contained, for example, $Ca^{2+}$ or $Cu^{2+}$.

The solid complexes which were obtained were treated in a column with a solution which contained between 0.01 and 0.1 moles per liter of calcium in the form of dissolved calcium chloride. After subsequent drying, the solid complexes had a harmful substance binding capacity, which was up to 30% higher, for harmful substances present in the form of anions, such as, for example, arsenic (V). By treatment with a copper chloride solution having a concentration of 0.01 to 0.1 moles per liter, an increase in the harmful substance binding capacity of up to 75% could be achieved.

The material which was obtained was dried in order to further improve the stability and abrasion resistance. The temperature of the air which was passed through the material during the drying was 50° C. The water content upon completion of the drying after 6 hours amounted to about 27%. Nevertheless, a dry, pourable product with an even better mechanical stability was obtained. Surprisingly, the binding capacity for harmful substances was not adversely affected by the drying treatment.

By activation with divalent cations and subsequent drying with moderately heated air, the resulting solid complexes are also suitable for treating water from which the removal of harmful substances is otherwise very difficult because such water contains, for example, dissolved or suspended materials which complex with the harmful substances to be removed when the harmful substance is bound to the adsorbent or which precipitate or deposit on the surface of the solid complexes.

EXAMPLE 4

An iron-containing solution was produced by mixing 14 kg of iron(II) sulfate in 230 liters of water. The resulting solution was then slowly reacted with 6 kg of sodium hydroxide and 1.2 kg of calcium hydroxide, while finely distributed air bubbles were continuously introduced into the solution. The consequent oxidation and precipitation formed a dark brown suspension of iron hydroxide. At the end of the reaction, an electrical conductivity of 54 mS/cm and a temperature of 37° C. were measured. The pH-value was 7.6.

The suspension was converted into a pasty mass by filtering and washing in a filter press. The salt content of the filtrate at the end of the washing operation amounted to about 4 g/liter. The solids content of the paste which was obtained amounted to about 24%. The paste was filled into a synthetic resin (plastic) container. The container was then closed and stored in a cooling chamber at a temperature of −16° C. Freezing of the water thereby produced a pressure increase in the suspension which reached a magnitude of $1*10^8$ Pa at the boundary between the water and the iron-containing solids. As a result of this pressure increase, iron-containing solid complexes formed in which the suspended particles coalesced and chemically bound water in the suspended particles was split off or eliminated. The process was completed after 110 hours.

After gradual warming, the iron-containing solid complexes could be removed from the container as dimensionally stable, brown to black granules. A clear, iron-free solution remained, which was discarded.

In this way a solids complex according to the invention was obtained in the form of a granulate in which the particle size lay between 0.2 and 2.2 mm. The granulate which was obtained can be used, either directly or after separation of fine particles having particle sizes less than 0.3 mm, in filter systems for separating hazardous substances, such as arsenic. The granulate which was obtained could be backwashed in such systems with only a small loss of fines (abrasion loss) amounting to about 0.16 mass-% per backwashing.

The stability and abrasion resistance of the material which was obtained could be substantially improved by drying at a temperature of 35° C. Such drying could be achieved, for example, by passing warmed air through a loose bed of the granular material in a drying vessel. The water content of the granular material at the end of the drying operation after 7 hours amounted to about 30%, however, a dry, pourable product with additionally improved mechanical stability was obtained. Surprisingly, the binding capacity of the material for hazardous substances was not diminished by the drying treatment.

The solid complexes produced according to the foregoing example had a hazardous material binding capacity of 36 g/kg, based on arsenic (V) at a pH-value of the treated solution of 7.0.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A process for producing an iron-containing sorption material for treating water or effluent, said process comprising adjusting the salt content of an iron salt-containing solution to transform the solution to an iron oxide-containing suspension, and treating the iron oxide-containing suspension to obtain a particulate iron oxide-containing sorption material from suspended iron-containing solids in the suspension, wherein said treating comprises subjecting the iron-containing solids to a relative pressure increase of the suspension at a temperature of less than 5° C., whereby the solids from the suspension form into solid complexes.

2. A process according to claim 1, wherein the pressure increase causes the solid complexes to be formed into dimensionally stable particles.

3. A process according to claim 1, wherein the pressure on the suspension is increased to within the range from about $4*10^7$ Pa to $10^8$ Pa.

4. A process according to claim 1, wherein the suspension has a solids content of at least 10%.

5. A process according to claim 1, wherein, subsequent to the pressure increase, a pressure release is effected to enhance the dimensional stability of the solid complexes.

6. A process according to claim 1, further comprising subjecting the solid complexes to drying.

7. A process according to claim 6, wherein the solid complexes are dried by heating.

8. A process according to claim 7, wherein drying is effected by subjecting the solid complexes to a heated air stream.

9. A process according to claim 1, further comprising treating the solid complexes with a cation-containing activating solution to enhance the activation of the sorbent particles.

10. A process according to claim 9, wherein said cation-containing activating solution is a solution containing divalent $Ca^{++}$ or $Cu^{++}$.

* * * * *